United States Patent
Hong

(10) Patent No.: US 11,767,826 B2
(45) Date of Patent: Sep. 26, 2023

(54) SOLAR POWER GENERATING APPARATUS

(71) Applicant: Jae Won Seo, Goyang-si (KR)

(72) Inventor: In Soon Hong, Paju-si (KR)

(73) Assignee: Jae Won Seo, Goyang-si (KR)

( * ) Notice: Subject to any disclaimer, the term of this patent is extended or adjusted under 35 U.S.C. 154(b) by 107 days.

(21) Appl. No.: 17/437,042

(22) PCT Filed: Mar. 25, 2020

(86) PCT No.: PCT/KR2020/004030
§ 371 (c)(1),
(2) Date: Sep. 7, 2021

(87) PCT Pub. No.: WO2020/209525
PCT Pub. Date: Oct. 15, 2020

(65) Prior Publication Data
US 2022/0178354 A1    Jun. 9, 2022

(30) Foreign Application Priority Data

Apr. 8, 2019 (KR) .......................... 10-2019-004907

(51) Int. Cl.
*F03G 6/04* (2006.01)
*F03D 9/25* (2016.01)
(Continued)

(52) U.S. Cl.
CPC ............... *F03G 6/045* (2013.01); *F03D 1/04* (2013.01); *F03D 9/25* (2016.05); *F24S 10/90* (2018.05);
(Continued)

(58) Field of Classification Search
CPC ... F03G 6/045; F03D 1/04; F03D 9/25; F03D 9/37; F03D 1/065; F03D 9/007;
(Continued)

(56) References Cited

U.S. PATENT DOCUMENTS 4,079,264 A * 3/1978 Cohen ....................... F03D 1/04
415/4.4
4,508,973 A * 4/1985 Payne ....................... F03D 1/04
290/55
(Continued)

FOREIGN PATENT DOCUMENTS

JP         2015021469 A     2/2015
KR    10-1983-0008033 A    11/1983
(Continued)

OTHER PUBLICATIONS

Extended European Search Report dated Nov. 11, 2022 as received in Application No. 20788122.8.

*Primary Examiner* — Hoang M Nguyen
(74) *Attorney, Agent, or Firm* — Maschoff Brennan

(57) ABSTRACT

The present invention relates to a solar power generating apparatus comprising: a body (100) having a three-dimensional shape so as to enable air flowing from the outside to be lifted, and having an acceleration flow path (142) formed on the top thereof so as to induce a bottleneck phenomenon of the air to be lifted; and a power generating fan (200) installed in the acceleration flow path (142). Accordingly, the air flowing into the body (100) is heated by sunlight and is lifted so as to operate the power generating fan (200) and enable power generation, such that eco-friendly energy can be produced.

2 Claims, 4 Drawing Sheets

(51) Int. Cl.
*F24S 10/90* (2018.01)
*F03D 1/04* (2006.01)

(52) U.S. Cl.
CPC ....... *F05B 2210/12* (2013.01); *F05B 2220/30* (2013.01)

(58) Field of Classification Search
CPC ... F24S 10/90; F05B 2210/12; F05B 2220/30; F05B 2260/24; Y02E 10/44; Y02E 10/728; Y02E 10/46; Y02E 10/70
USPC ............................................ 60/641.8–641.15
See application file for complete search history.

(56) References Cited

U.S. PATENT DOCUMENTS

| | | | | |
|---|---|---|---|---|
| 4,935,639 | A | * | 6/1990 | Yeh ............................ F03D 9/39 |
| | | | | 290/55 |
| 8,459,930 | B2 | * | 6/2013 | Krippene .............. F03D 3/0436 |
| | | | | 415/4.4 |
| 8,961,103 | B1 | * | 2/2015 | Wolff ........................ F03D 3/02 |
| | | | | 415/4.4 |
| 2011/0074164 | A1 | | 3/2011 | Kobayashi |
| 2016/0281689 | A1 | | 9/2016 | Kim et al. |
| 2016/0298611 | A1 | | 10/2016 | Jazzar |

FOREIGN PATENT DOCUMENTS

| | | |
|---|---|---|
| KR | 10-0910583 B1 | 8/2009 |
| KR | 10-1452412 B1 | 10/2014 |
| KR | 10-2037456 B1 | 10/2019 |

\* cited by examiner

[FIG. 1]
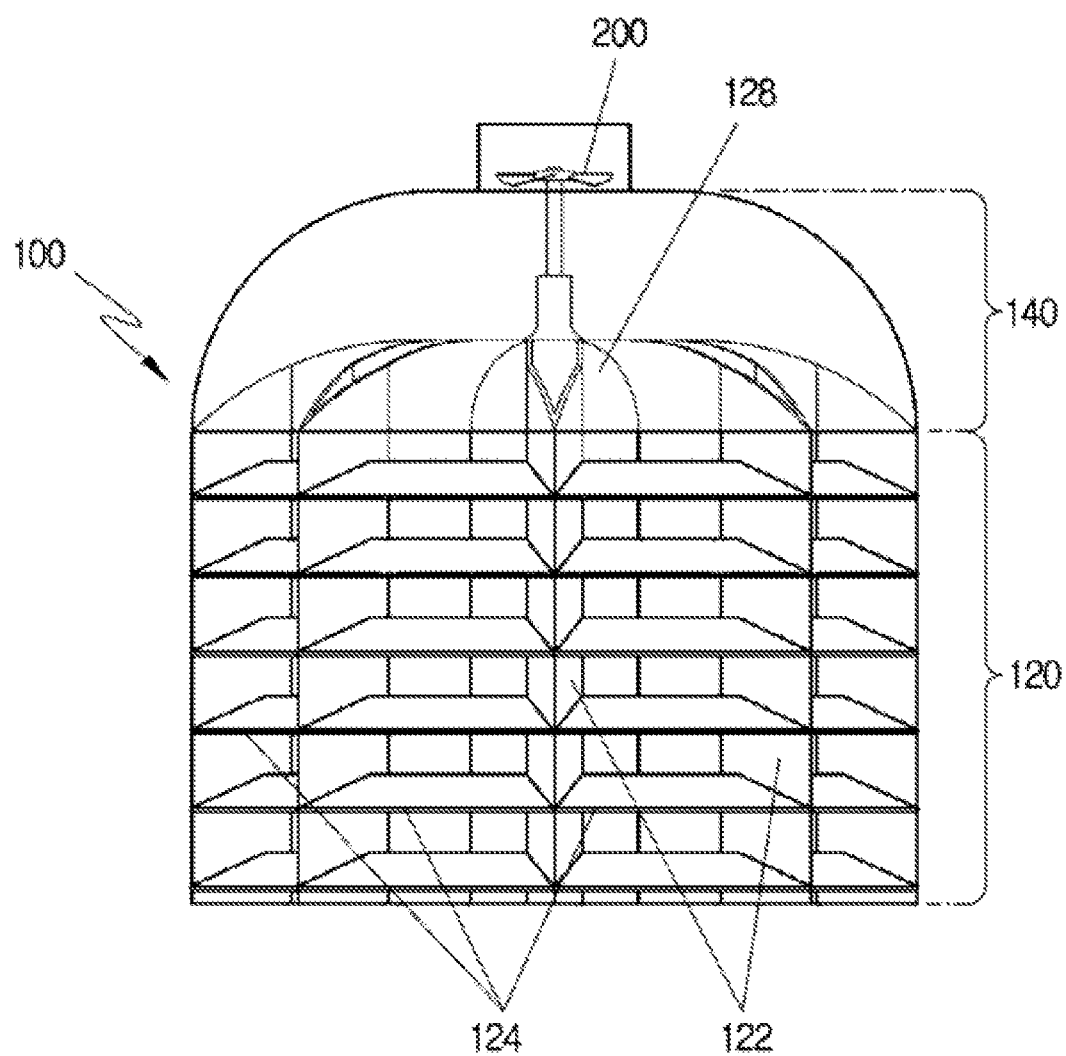

[FIG. 2]
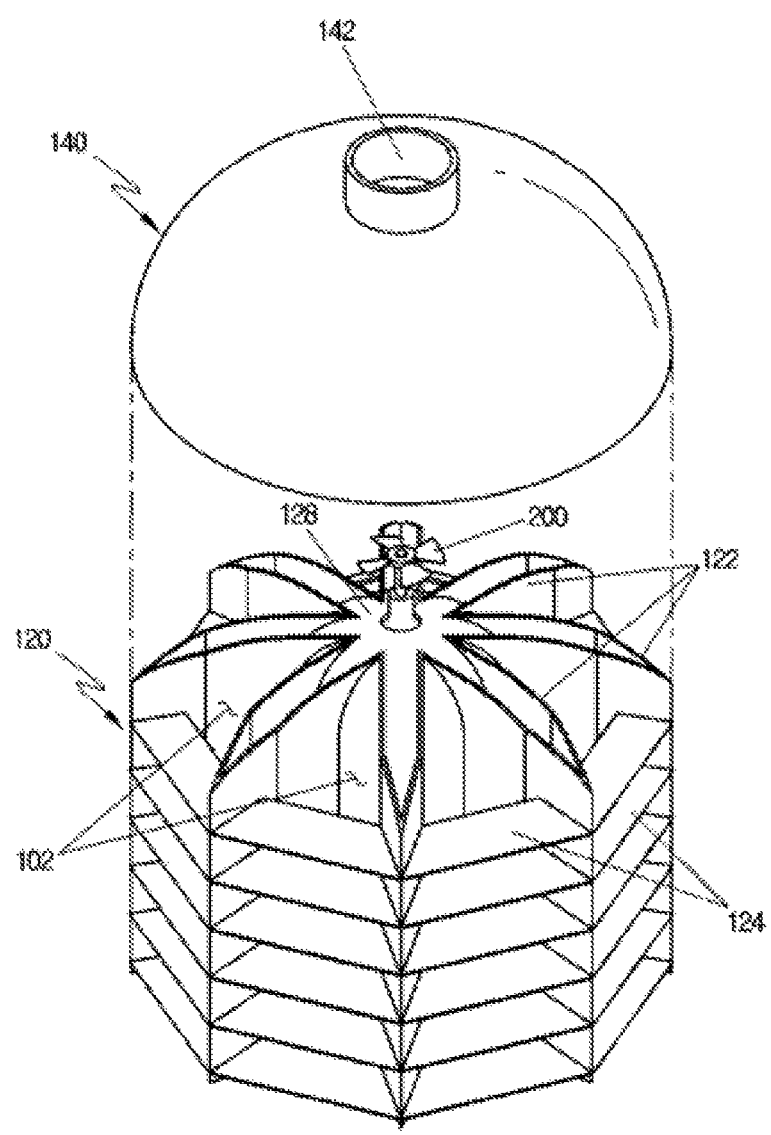

[FIG. 3]
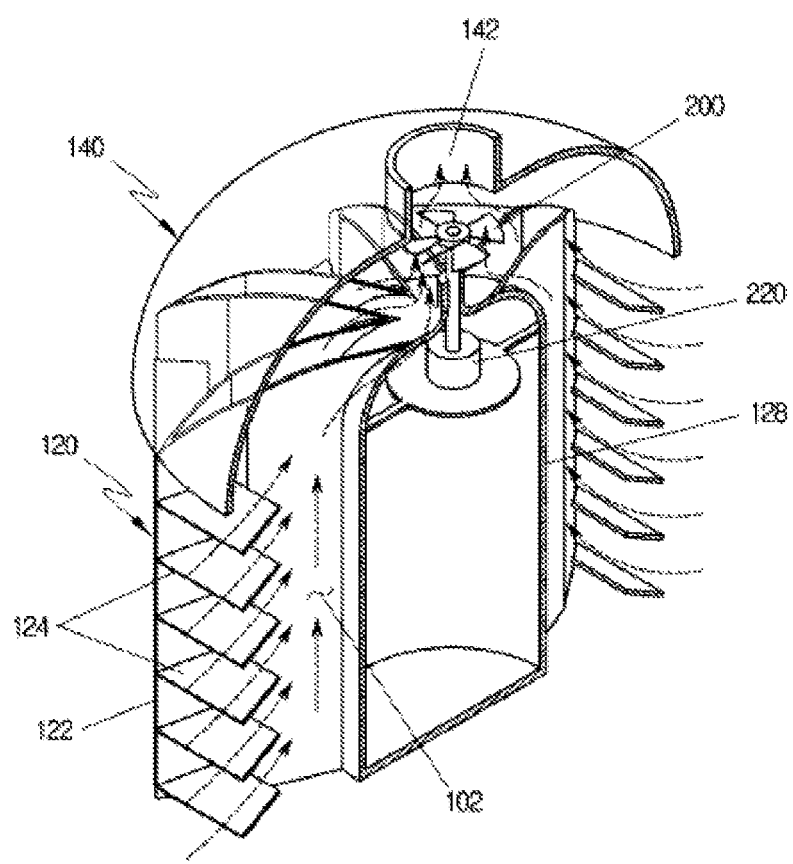

[FIG. 4]
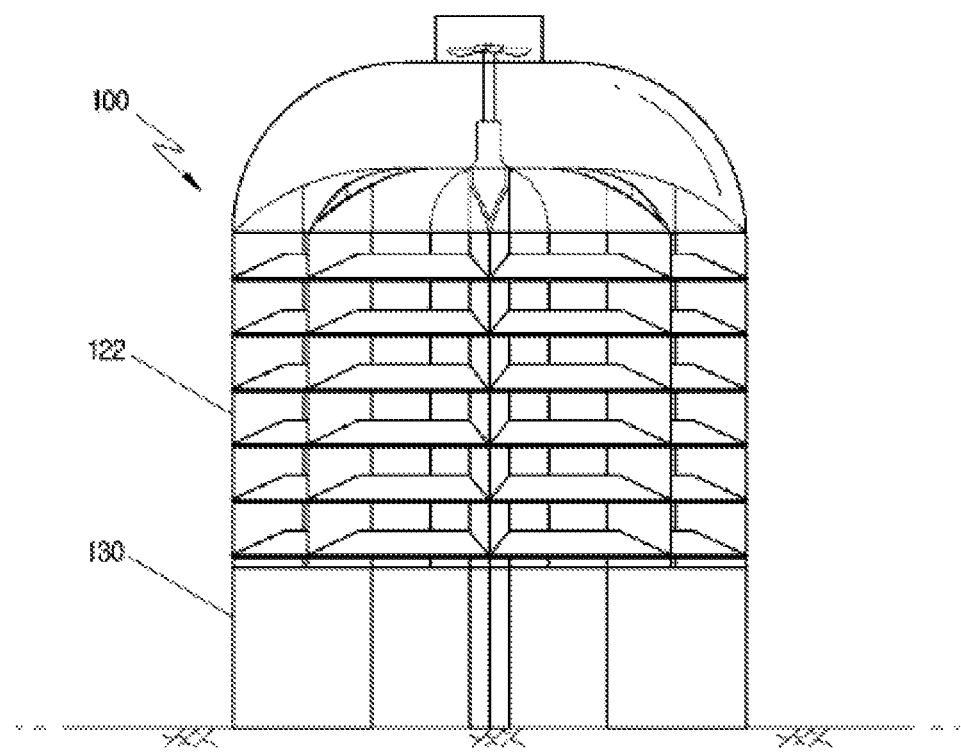

SOLAR POWER GENERATING APPARATUS

TECHNICAL FIELD

The present invention relates to a power generating apparatus, more particularly, a solar power generating apparatus that rotates a fan using an ascending air current ("up-current") generated by solar heat so as to enable power generation.

BACKGROUND ART

Power generation by fossil fuels causes a problem that fuel depletion inevitably occurs, as well as other significant environmental problems. A representative example of such environmental problems is rapid increase in generation of fine dust due to coal power generation in recent years, and another is leakage of radioactive materials due to, for example, the explosion of the nuclear power plant in Japan.

Therefore, efforts have been made to produce electricity in eco-friendly ways. An example of such efforts is alternative energy possibly replacing fossil fuels. Specifically, there is power generation using wind power or tide power, and a solar power generating plant to generate power through solar panels is a representative example.

PRIOR ART LITERATURE

Patent Literature (Patent Document 1) Korean Patent Registration No. 10-1452412 (published on Oct. 23, 2014)

DISCLOSURE

Technical Problem

The present disclosure has been proposed to overcomeconventional problems due to use of fossil fuels, and an object of the present disclosure is to propose a solar power generating apparatus that can generate eco-friendly power using sunlight as a representative alternative energy source.

Technical Solution

In order to achieve the above object, the present invention has proposed a solar power generating apparatus that generates an ascending air current ("up-current") by heating the air using sunlight and rotates a fan through the up-current to generate power, thereby producing electricity in an eco-friendly way.

Advantageous Effects

As described above, according to the present invention, electricity can be generated in an eco-friendly manner using sunlight, thereby solving various problems associated with use of fossil fuels.

DESCRIPTION OF DRAWINGS

FIG. 1 is an exemplary view illustrating a solar power generating apparatus according to the present invention.

FIG. 2 is an exploded view illustrating main parts of the solar power generating apparatus according to the present invention.

FIG. 3 is a cross-sectional view illustrating the solar power generating apparatus according to the present invention.

FIG. 4 is an exemplary view illustrating a state of installing the solar power generating apparatus according to the present invention.

BEST MODE

According to the present invention, in order to generate an ascending air current heated by sunlight and to generate power by rotating a fan through the ascending air current, which in turn enables production of electricity in an eco-friendly manner, there is provided a solar power generating apparatus which includes: a body having a three-dimensional shape to guide air flowing from the outside to ascend and being provided with an acceleration flow path on top of the body to induce a bottleneck phenomenon of the ascending air; and a power generation fan mounted on the acceleration flow path, wherein the air introduced into the body is heated by sunlight and rotates the power generation fan while flowing upward, thereby enabling power generation.

Hereinafter, the present invention will be described in detail with reference to the accompanying FIGS. 1 to 4.

FIG. 1 is an exemplary view illustrating a solar power generating apparatus according to the present invention; FIG. 2 is an exploded view illustrating main parts of the solar power generating apparatus according to the present invention; and FIG. 3 is a cross-sectional view illustrating the solar power generating apparatus according to the present invention.

As illustrated above, the solar power generating apparatus of the present invention may include a body 100 formed to guide air to ascend, and a power generation fan 200 mounted inside the body 100 to generate power while rotating by the ascending air.

The body 100 may be formed to have a three-dimensional shape and to flow air from the outside into the body 100, thereby flowing the air upward (or guiding the air to ascend). The air introduced into the body 100 may be heated by sunlight to thus flow upward. In this regard, an acceleration flow path 142 may be mounted on top of the body 100 in order to induce a bottleneck phenomenon of the ascending air so that a speed of the ascending air may be sharply increased while the ascending air passes through the acceleration flow path 142. As a result, the power generation fan 200 may rotate rapidly.

The body 100 may include a base 120 and a cap 140 that is placed on top of the base 120. In this configuration, an upward space 102 is formed in the base 120 and the air flowing from the outside may ascend through the upward space 102, while the cap 140 has an upwardly convex structure so that a ceiling surface is spaced apart from an upper end of the base 120 by a predetermined distance, thereby forming the acceleration flow path 142 in the center of the structure. Therefore, the air ascending through the upward space 102 is guided to the center of the cap 140, and in turn ascends through the acceleration flow path 142 and then is discharged to the outside of the body 100 while rotating the power generation fan 200. Since the cap 140 is upwardly convex, the internal ceiling surface also becomes upwardly convex whereby the ascending air may be smoothly guided to the acceleration flow path 142.

The base 120 may include a plurality of columns 122 erected at a predetermined interval to occupy a desired area, as well as heat plates 124 installed with a height difference between the columns 122.

The columns 122 may be disposed on a concentric circle so that the base 120 has a cylindrical shape as a whole. A spacing in arrangement of the columns 122 may be constant or may be differently formed as necessary. Due to this, outer appearance of the base 120 may be approximately formed in a polygonal cylindrical shape or a cylindrical shape.

The column 122 may have a predetermined thickness, and the thickness may become thinner toward the outside of the base 120 so as to form a pointed flat cross-section. Accordingly, the area into which external air is introduced may be maximized and the introduced air may be smoothly guided into the base 120.

The column formed as described above may be empty and configured to guide the ascending air to pass therethrough.

The base 120 may have a hollow cylindrical shape with an inner empty space and may be provided with an inner body 128 mounted on the inner space. In such a configuration, the column 122 may be fixedly erected in contact with an outer peripheral surface of the inner body 128, while the heat plate 124 may be formed in a standard size such that an inner end of the heat plate is spaced apart from the inner body 128 by a predetermined interval, thereby forming an ascending space 102 between the inner end of the heat plate 124 and the outer peripheral surface of the inner body 128.

The heat plate 124 is preferably formed to be inclined upward from the outside to the inside. Therefore, when external air is introduced into the body 100, the air may flow in an ascending direction to generate an ascending air current ("up-current") more smoothly and further effectively receive sunlight due to inclination, thereby being quickly heated.

The heat plate 124 may be formed in black. As a result, it is possible to more effectively generate up-current by effectively absorbing sunlight and rapidly heating the heat plate. For the same reason, the inner body 128 is also preferably formed in black to allow rapid heating and retain heat for a long time.

The inner body 128 may have an upper end disposed at a height spaced apart (by a predetermined distance) from an inlet of the acceleration flow path 142 provided on the cap 140. Further, the inner body may have a structure of closed upper end wherein a shaft of the power generation fan 200 passes through the center of the closed upper end. Further, a generator 220 may be installed inside the inner body 128 wherein a lower end of the above shaft is connected to the generator 220. Meanwhile, it is preferable that an upper end of the closed inner body 128 has a upwardly-convex shape to smoothly guide up-current to the power generation fan 200 along the curved surface.

The cap 140 may be partially or entirely formed of a transparent material. When formed as described above, sunlight is transmitted to reach the inside of the body 100. Accordingly, the air introduced into the body 100 and the inner body 120 may be quickly heated.

Hereinafter, a process of generating power using the solar power generating apparatus according to the present invention will be described.

In the solar power generating apparatus according to the present invention, when the sun is rising (that is, during daytime), the body 100 is heated by sunlight. Accordingly, the air introduced into the body 100 may be heated and rise along an ascending space 102. At the same time, external air is continuously introduced into the body 100 between the heat plates 120 and through a lower end of the body 100, thereby leading to an ascending air current (that is, up-current). In this case, the air introduced between the heat plates 120 may be naturally introduced and guided in an upward direction by the heat plate 124 formed in an inclined manner, thereby promoting the up-current.

Likewise, if the column 122 has a hollow shape with an empty inner space, the air rises while flowing from the lower end of the column 122 and is joined with the air ascending through the ascending space 102 while being discharged out of the upper end of the column 122.

The ascending air as described above reaches an upper portion of the body 100 and then is discharged to the outside of the body 100 through the acceleration flow path 142. In this process, the power generation fan 200 is turned and, accordingly, electricity may be produced in an eco-friendly manner. The electricity produced as described above may be stored in a storage battery (not shown) and used for purposes necessary in real life.

FIG. 4 is an exemplary view illustrating a state of installing the solar power generation apparatus according to the present invention.

As such, the solar power generation apparatus according to the present invention may be provided with legs 130 on the bottom of the body 100 and thus be installed to be spaced apart by a predetermined height from the ground. Therefore, external air may also flow from the lower end of the body 100. Such legs 130 may be formed by extending some or all of the columns 122 described above downward. However, the configuration of the legs is not particularly limited to the above but, if required, the legs may also be separately prepared and connected to the lower end of the body 100.

DESCRIPTION OF REFERENCE NUMERALS

100: Body 102: Ascending space
120: Base 122: Column
124: Heat plate 128: Inner body
130: Leg
140: Cap 142: Acceleration flow path
200: Power generation fan 220: Generator

The invention claimed is:

1. A solar power generating apparatus, comprising:
a body (100) having a three-dimensional shape to guide air flowing from an outside to ascend and being provided with an acceleration flow path (142) on top of the body to induce a bottleneck phenomenon of the ascending air; and
a power generation fan (200) mounted on the acceleration flow path (200),
wherein the body (100) includes: a base (120) in which an ascending space (102) is formed; and a cap (140) placed on an upper end of the base (120), in which the acceleration flow path (142) is provided and a ceiling surface is spaced apart from an upper end of the base (120) by a predetermined interval,
wherein the base (120) includes: an inner body (128) having a hollow cylindrical shape with an empty inner space; columns (122) erected at a predetermined interval along an outer peripheral surface of the inner body (128) and having an inner empty space through which the ascending air passes; and a heat plate (124) mounted between the columns (122) to be upwardly inclined from the outside to an inside with a difference in height, wherein an inner end thereof is spaced apart from the outer peripheral surface of the inner body (128) by a predetermined interval, and wherein the ascending space (102) is formed between the inner end of the heat plate (124) and the outer peripheral surface of the inner body (128), wherein legs (130) are provided on a bottom of the base (120) such that the base (120) is spaced apart from the ground by a predetermined height, whereby, when the body (100) is heated by sunlight, external air is introduced through a spacing between the heat plates (124) at a lateral side of the base (120), while external air also flows from a lower portion of the base (120) and rises along the ascending space (102) and an inside of the columns (122) to guide an ascending air current so that the ascending air current rotates the power generation fan (200), thereby enabling power generation.

2. The apparatus according to claim 1, wherein the columns (122) are disposed on a concentric circle so that the base (120) has a cylindrical shape.

\* \* \* \* \*